United States Patent
Luukkainen et al.

(10) Patent No.: US 9,983,800 B2
(45) Date of Patent: May 29, 2018

(54) APPARATUS AND METHOD TO SHARE HOST SYSTEM RAM WITH MASS STORAGE MEMORY RAM

(71) Applicant: Memory Technologies LLC, Las Vegas, NV (US)

(72) Inventors: Olli Luukkainen, Salo (FI); Kimmo Mylly, Ylojarvi (FI); Jani Hyvonen, Tampere (FI)

(73) Assignee: Memory Technologies LLC, Las Vegas, NV (US)

( * ) Notice: Subject to any disclaimer, the term of this patent is extended or adjusted under 35 U.S.C. 154(b) by 0 days. days.

(21) Appl. No.: 15/335,688

(22) Filed: Oct. 27, 2016

(65) Prior Publication Data

US 2017/0046067 A1 Feb. 16, 2017

Related U.S. Application Data

(63) Continuation of application No. 14/945,757, filed on Nov. 19, 2015, now abandoned, which is a
(Continued)

(51) Int. Cl.
*G06F 12/00* (2006.01)
*G06F 3/06* (2006.01)
(Continued)

(52) U.S. Cl.
CPC ............ *G06F 3/061* (2013.01); *G06F 3/0631* (2013.01); *G06F 3/0655* (2013.01);
(Continued)

(58) Field of Classification Search
CPC ............. G06F 12/0223; G06F 12/0246; G06F 12/0638; G06F 2212/171; G06F 2212/205;
(Continued)

(56) References Cited

U.S. PATENT DOCUMENTS 5,586,291 A 12/1996 Lasker et al.
5,701,516 A 12/1997 Cheng et al.
(Continued)

FOREIGN PATENT DOCUMENTS

AU 2005200855 9/2004
CN 1762025 4/2006
(Continued)

OTHER PUBLICATIONS

International Search Report for PCT Application No. PCT/FI2009/050083 dated Jun. 3, 2009, 4 pages.
(Continued)

*Primary Examiner* — Yong Choe
(74) *Attorney, Agent, or Firm* — Lee & Hayes, PLLC

(57) ABSTRACT

A method includes, in one non-limiting embodiment, sending a request from a mass memory storage device to a host device, the request being one to allocate memory in the host device; writing data from the mass memory storage device to allocated memory of the host device; and subsequently reading the data from the allocated memory to the mass memory storage device. The memory may be embodied as flash memory, and the data may be related to a file system stored in the flash memory. The method enables the mass memory storage device to extend its internal volatile RAM to include RAM of the host device, enabling the internal RAM to be powered off while preserving data and context stored in the internal RAM.

20 Claims, 7 Drawing Sheets

Related U.S. Application Data continuation of application No. 14/520,030, filed on Oct. 21, 2014, now Pat. No. 9,208,078, which is a continuation of application No. 12/455,763, filed on Jun. 4, 2009, now Pat. No. 8,874,824.

(51) Int. Cl.
*G06F 12/02* (2006.01)
*G06F 12/06* (2006.01)

(52) U.S. Cl.
CPC ........ *G06F 3/0679* (2013.01); *G06F 12/0223* (2013.01); *G06F 12/0246* (2013.01); *G06F 12/0638* (2013.01); *G06F 2212/171* (2013.01); *G06F 2212/205* (2013.01); *G06F 2212/7202* (2013.01); *G06F 2212/7203* (2013.01); *G06F 2212/7207* (2013.01); *Y02D 10/13* (2018.01)

(58) Field of Classification Search
CPC ..... G06F 2212/7202; G06F 2212/7203; G06F 2212/7207; G06F 3/061; G06F 3/0631; G06F 3/0655; G06F 3/0679
See application file for complete search history.

(56) References Cited

U.S. PATENT DOCUMENTS

| | | | |
|---|---|---|---|
| 5,802,069 | A | 9/1998 | Coulson |
| 5,809,340 | A | 9/1998 | Bertone et al. |
| 5,924,097 | A | 7/1999 | Hill et al. |
| 6,067,300 | A | 5/2000 | Baumert et al. |
| 6,115,785 | A | 9/2000 | Estakhri et al. |
| 6,480,936 | B1 | 11/2002 | Ban et al. |
| 6,513,094 | B1 | 1/2003 | Magro |
| 6,522,586 | B2 | 2/2003 | Wong |
| 6,526,472 | B2 | 2/2003 | Suzuki |
| 6,665,747 | B1 | 12/2003 | Nazari |
| 6,785,764 | B1 | 8/2004 | Roohparvar |
| 6,842,829 | B1 | 1/2005 | Nichols et al. |
| 7,136,963 | B2 | 11/2006 | Ogawa et al. |
| 7,181,574 | B1 | 2/2007 | Lele |
| 7,321,958 | B2 | 1/2008 | Hofstee et al. |
| 7,480,749 | B1 | 1/2009 | Danilak |
| 7,571,295 | B2 * | 8/2009 | Sakarda ............. G06F 12/0891 711/154 |
| 7,697,311 | B2 | 4/2010 | Fukuda et al. |
| 7,809,962 | B2 | 10/2010 | Chang et al. |
| 8,190,803 | B2 | 5/2012 | Hobson et al. |
| 8,218,137 | B2 | 7/2012 | Noh et al. |
| 8,321,713 | B2 | 11/2012 | Nobunaga |
| 8,514,621 | B2 | 8/2013 | Choi et al. |
| 8,826,051 | B2 | 9/2014 | Wakrat et al. |
| 2002/0087817 | A1 | 7/2002 | Tomaiuolo et al. |
| 2002/0093913 | A1 | 7/2002 | Brown et al. |
| 2002/0108014 | A1 | 8/2002 | Lasser |
| 2003/0028737 | A1 | 2/2003 | Kaiya et al. |
| 2003/0137860 | A1 * | 7/2003 | Khatri .................. G11C 7/1048 365/63 |
| 2004/0010671 | A1 | 1/2004 | Sampsa et al. |
| 2004/0049692 | A1 | 3/2004 | Okamoto |
| 2004/0203670 | A1 | 10/2004 | King et al. |
| 2004/0221124 | A1 | 11/2004 | Beckert et al. |
| 2004/0230317 | A1 | 11/2004 | Kumar et al. |
| 2005/0010738 | A1 | 1/2005 | Stockdale et al. |
| 2005/0071570 | A1 | 3/2005 | Takasugl et al. |
| 2005/0097280 | A1 | 5/2005 | Hofstee et al. |
| 2005/0204113 | A1 | 9/2005 | Harper et al. |
| 2006/0041888 | A1 | 2/2006 | Radulescu et al. |
| 2006/0069899 | A1 | 3/2006 | Schoinas et al. |
| 2006/0075147 | A1 | 4/2006 | Schoinas et al. |
| 2006/0075395 | A1 | 4/2006 | Lee et al. |
| 2006/0174056 | A1 | 8/2006 | Lambert et al. |
| 2006/0179212 | A1 | 8/2006 | Kim et al. |
| 2006/0184758 | A1 | 8/2006 | Satori et al. |
| 2006/0224789 | A1 | 10/2006 | Cho et al. |
| 2006/0280077 | A1 | 12/2006 | Suwa |
| 2007/0088867 | A1 | 4/2007 | Cho et al. |
| 2007/0207854 | A1 | 9/2007 | Wolf et al. |
| 2007/0234006 | A1 | 10/2007 | Radulescu et al. |
| 2007/0283078 | A1 | 12/2007 | Li et al. |
| 2008/0080688 | A1 | 4/2008 | Burgan et al. |
| 2008/0104291 | A1 | 5/2008 | Hinchey |
| 2008/0126857 | A1 | 5/2008 | Basham et al. |
| 2008/0127131 | A1 | 5/2008 | Gao et al. |
| 2008/0162792 | A1 | 7/2008 | Wu et al. |
| 2008/0183954 | A1 | 7/2008 | Lee et al. |
| 2008/0189485 | A1 | 8/2008 | Jung et al. |
| 2008/0228984 | A1 | 9/2008 | Yu et al. |
| 2008/0244173 | A1 | 10/2008 | Takai |
| 2008/0281944 | A1 | 11/2008 | Vorne et al. |
| 2008/0282030 | A1 | 11/2008 | Kalwitz et al. |
| 2008/0320211 | A1 | 12/2008 | Kinoshita |
| 2009/0106503 | A1 | 4/2009 | Lee et al. |
| 2009/0157950 | A1 | 6/2009 | Selinger |
| 2009/0164705 | A1 | 6/2009 | Gorobets |
| 2009/0182940 | A1 | 7/2009 | Matsuda et al. |
| 2009/0182962 | A1 * | 7/2009 | Khmelnitsky ...... G06F 13/4239 711/162 |
| 2009/0198871 | A1 | 8/2009 | Tzeng |
| 2009/0198872 | A1 | 8/2009 | Tzeng |
| 2009/0210615 | A1 | 8/2009 | Struk et al. |
| 2009/0216937 | A1 | 8/2009 | Yasufuku |
| 2009/0222629 | A1 | 9/2009 | Yano et al. |
| 2009/0307377 | A1 | 12/2009 | Anderson et al. |
| 2009/0313420 | A1 | 12/2009 | Wiesz et al. |
| 2009/0327584 | A1 | 12/2009 | Tetrick et al. |
| 2010/0005281 | A1 | 1/2010 | Buchmann et al. |
| 2010/0030961 | A9 | 2/2010 | Ma et al. |
| 2010/0037012 | A1 | 2/2010 | Yano et al. |
| 2010/0100648 | A1 | 4/2010 | Madukkarumukumana et al. |
| 2010/0106886 | A1 | 4/2010 | Marcu et al. |
| 2010/0106901 | A1 | 4/2010 | Higeta et al. |
| 2010/0115193 | A1 | 5/2010 | Manus et al. |
| 2010/0161882 | A1 | 6/2010 | Stern et al. |
| 2010/0169558 | A1 | 7/2010 | Honda et al. |
| 2010/0169604 | A1 | 7/2010 | Trika et al. |
| 2010/0172180 | A1 | 7/2010 | Paley et al. |
| 2010/0250836 | A1 | 9/2010 | Sokolov et al. |
| 2010/0268928 | A1 | 10/2010 | Wang et al. |
| 2010/0293420 | A1 | 11/2010 | Kapil et al. |
| 2010/0312947 | A1 | 12/2010 | Luukkainen et al. |
| 2011/0082967 | A1 | 4/2011 | Deshkar et al. |
| 2011/0087804 | A1 | 4/2011 | Okaue et al. |
| 2011/0099326 | A1 | 4/2011 | Jung et al. |
| 2011/0145537 | A1 | 6/2011 | Feldman et al. |
| 2011/0208914 | A1 | 8/2011 | Winokur et al. |
| 2011/0264860 | A1 | 10/2011 | Hooker et al. |
| 2011/0296088 | A1 | 12/2011 | Duzly et al. |
| 2012/0079171 | A1 | 3/2012 | Ju et al. |
| 2012/0102268 | A1 | 4/2012 | Smith et al. |
| 2012/0131263 | A1 | 5/2012 | Yeh |
| 2012/0131269 | A1 | 5/2012 | Fisher et al. |
| 2012/0210326 | A1 | 8/2012 | Torr et al. |
| 2013/0007348 | A1 | 1/2013 | Fai et al. |
| 2013/0138840 | A1 | 5/2013 | Kegel et al. |
| 2013/0145055 | A1 | 6/2013 | Kegel et al. |
| 2013/0282957 | A1 | 10/2013 | Mylly |
| 2013/0332691 | A1 | 12/2013 | Hyvonen et al. |
| 2013/0339635 | A1 | 12/2013 | Amit et al. |
| 2013/0346668 | A1 | 12/2013 | Floman et al. |
| 2014/0188719 | A1 | 7/2014 | Poornachandran et al. |
| 2016/0062659 | A1 | 3/2016 | Floman et al. |
| 2016/0357436 | A1 | 12/2016 | Hyvonen et al. |
| 2017/0038975 | A1 | 2/2017 | Mylly et al. |

FOREIGN PATENT DOCUMENTS

| | | |
|---|---|---|
| CN | 101329654 | 12/2008 |
| CN | 101887350 | 11/2010 |
| CN | 101937318 | 1/2011 |
| CN | 101952808 | 1/2011 |
| EP | 0481716 | 4/1992 |
| EP | 1091283 | 4/2001 |

(56) References Cited

FOREIGN PATENT DOCUMENTS

| | | |
|---|---|---|
| EP | 1094392 | 4/2001 |
| EP | 1763036 | 3/2007 |
| JP | 59135563 | 8/1984 |
| JP | 0268671 | 3/1990 |
| JP | H02068671 | 3/1990 |
| JP | 06124596 | 5/1994 |
| JP | H06236681 | 8/1994 |
| JP | 10228413 | 8/1998 |
| JP | H10240607 | 9/1998 |
| JP | 11143643 | 5/1999 |
| JP | 2000003309 | 1/2000 |
| JP | 2000057039 | 2/2000 |
| JP | 2000067584 | 3/2000 |
| JP | 2002108691 | 4/2002 |
| JP | 2002259322 | 9/2002 |
| JP | 2002351741 | 12/2002 |
| JP | 2003015949 | 1/2003 |
| JP | 2003150445 | 5/2003 |
| JP | 2004021669 | 1/2004 |
| JP | 2006011818 | 1/2006 |
| JP | 2006195569 | 7/2006 |
| JP | 2006221627 | 8/2006 |
| JP | 2006520958 | 9/2006 |
| JP | 2007079724 | 3/2007 |
| JP | 2007115382 | 5/2007 |
| JP | 2007518166 | 7/2007 |
| JP | 2007220210 | 8/2007 |
| JP | 2011022657 | 2/2011 |
| JP | 2011028537 | 2/2011 |
| JP | 2011086064 | 4/2011 |
| JP | 2011238175 | 11/2011 |
| JP | 2013109419 | 6/2013 |
| KR | 20060082040 A | 7/2006 |
| TW | 200701233 | 1/2007 |
| TW | 201135746 | 10/2011 |
| TW | 201209831 | 3/2012 |
| TW | 201214446 | 4/2012 |
| WO | WO99/65193 | 12/1999 |
| WO | WO2004084231 | 9/2004 |
| WO | WO2005088468 | 6/2005 |
| WO | WO2005066773 A1 | 7/2005 |
| WO | WO2012021380 | 2/2012 |

OTHER PUBLICATIONS

Tanenbaum, "Structured Computer Organization", Prentice-Hall, Inc, 1984, 5 pages.
U.S. Appl. No. 13/358,806, filed Jan. 26, 2012, Mylly, et al., "Apparatus and Method to Provide Cache Move with Non-Volatile Mass Memory System," 45 pages.
Apostolakis, et al., "Software-Based Self Testing of Symmetric Shared-Memory Multiprocessors", IEEE Transactions on Computers, vol. 58, No. 12, Dec. 2009, 13 pages.
The Chinese Office Action dated Dec. 19, 2013 for Chinese patent application No. 200980106241.1, a counterpart foreign application of U.S. Pat. No. 8,307,180, 3 pages.
Translated Chinese Office Action dated Mar. 28, 2016 for Chinese Patent Application No. 201380006769.8, a counterpart foreign application of U.S. Appl. No. 13/358,806, 36 pages.
The Chinese Office Action dated Apr. 1, 2016 for Chinese Patent Application No. 201310136995.X, a counterpart foreign application of U.S. Appl. No. 13/451,951, 8 pages.
The Chinese Office Action dated Apr. 9, 2013 for Chinese patent application No. 200980106241.1, a counterpart foreign application of U.S. Pat. No. 8,307,180, 4 pages.
Translated Chinese Office Action dated Jul. 17, 2015 for Chinese patent application No. 201310136995.X, a counterpart foreign application of U.S. Appl. No. 13/451,951, 28 pages.
"Embedded MultiMediaCard (eMMC) Mechanical Standard", JESD84-C43, JEDEC Standard, JEDEC Solid State Technology Association, Jun. 2007, 13 pages.

European Search Report for Application No. 09715221.9, dated Oct. 25, 2011, 30 pages.
The Extended European Search Report dated Aug. 31, 2015 for European patent application No. 13741595.6, 8 pages.
"How to Boot an Embedded System for an eMMC Equipped with a Microsoft FAT File System", AN2539 Numonyx Application Note, Nov. 2008, 25 pages.
JEDEC Standard, "Embedded MultiMediaCard (eMMC) Product Standard, High Capacity," JESD84-A42, Jun. 2007, 29 pages.
JEDEC Standard, "Embedded ZmultiMediaCard(eMMC) eMMC/Card Product Standard, high Capacity, Including Reliable Write, Boot, and Sleep Modes," (MMCA, 4.3), JSEDD84-A43, Nov. 2007, 166 pages.
JEDEC Standard, "Embedded MultiMediaCard (eMMC) Mechanical Standard," JESD84-C43, Jun. 2007, 13 pages.
Translated Japanese Office Action dated Jan. 16, 2013 for Japanese patent application No. 2010548134, a counterpart foreign application of U.S. Pat. No. 8,307,180, 6 pages.
Translated Japanese Office Action dated Jan. 7, 2015 for Japanese patent application No. 2013-103695, a counterpart foreign application of U.S. Pat. No. 8,307,180, 8 pages.
Translated Japanese Office Action dated Nov. 25, 2013 for Japanese patent application No. 2013-103695, a counterpart foreign application of U.S. Pat. No. 8,307,180, 8 pages.
Translated Japanese Office Action dated Dec. 14, 2015 for Japanese patent application No. 2013-103695, a counterpart foreign application of U.S. Pat. No. 8,307,180, 4 pages.
Translated Japanese Office Action dated Jun. 30, 2016 for Japanese Patent Application No. 2015-099731, a counterpart foreign application of U.S. Pat. No. 8,307,180, 9 pages.
The Japanese Office Action dated Aug. 27, 2013 for Japanese patent application No. 2010548134, a counterparf foreign application of U.S. Pat. No. 8,307,180, 4 pages.
Japanese Search Report for Application No. 2010-548134, dated May 10, 2012, 11 pages.
Translated Korean Office Action dated Mar. 3, 2014 for Korean patent application No. 2013-7002338, a counterpart foreign application of U.S. Pat. No. 8,307,180, 5 pages.
Office Action for Korean Patent Application No. 10-2010-7021534, dated Sep. 30, 2011, 3 pages.
Li, et al., "A Method for Improving Concurrent Write Performance by Dynamic Mapping Virtual Storage System Combined with Cache Management", 2011 IEEE 7th International Conference of Parallel Distributed System, Dec. 7-8, 2011, 10 pages.
Lin et al., "A NAND Flash Memory Controller for SDIMMC Flash Memory Card," IEEE Dec. 2006, pp. 933-935.
Numonyz, "How to boot an embedded system from an eMMCTM equipped with a Microsoft FAT file system." Application note AN2539, Nov. 2008, pp. 1-25.
Final Office Action for U.S. Appl. No. 13/527,745, dated Jan. 16, 2015, Matti Floman, "Virtual Memory Module", 22 pages.
Office action for U.S. Appl. No. 14/945,757, dated Jan. 21, 2016, Luukkainen et al., "Apparatus and Method to Share Host System RAM with Mass Storage Memory RAM", 16 pages.
Office Action for U.S. Appl. No. 13/451,951, dated Jan. 7, 2014, Kimmo J. Mylly, "Managing Operational State Data in Memory Module", 24 pages.
Office Action for U.S. Appl. No. 13/951,169, dated Oct. 8, 2013, Jani Hyvonen, "Extended Utilization Area for a Memory Device", 9 pages.
Office Action for U.S. Appl. No. 13/358,806, dated Nov. 27, 2013, Kimmo J. Mylly, "Apparatus and Method to Provide Cache Move With Non-Volatile Mass Memory System", 26 pages.
Office action for U.S. Appl. No. 13/358,806, dated Nov. 6, 2015, Mylly et al., "Apparatus and Method to Provide Cache Move With Non-Volatile Mass Memory System", 44 pages.
Non-Final Office Action for U.S. Appl. No. 14/863,253, dated Dec. 21, 2015, Matti Floman, "Virtual Memory Module", 15 pages.
Final Office Action for U.S. Appl. No. 13/451,951, dated Dec. 4, 2014, Kimmo J. Mylly, "Managing Operational State Data of a Memory Module Using Host Memory in Association with State Change", 24 pages.

(56) References Cited

OTHER PUBLICATIONS

Office Action for U.S. Appl. No. 14/520,030, dated Dec. 4, 2014, Olli Luukkainen, "Apparatus and Method to Share Host System RAM with Mass Storage Memory RAM", 6 pages.
Office Action for U.S. Appl. No. 13/596,480, dated Mar. 13, 2014, Kimmo J. Mylly, "Dynamic Central Cache Memory", 15 pages.
Final Office Action for U.S. Appl. No. 13/951,169, dated Mar. 27, 2014, Jani Hyvonen, "Extended Utilization Area for a Memory Device", 10 pages.
Office Action for U.S. Appl. No. 13/358,806, dated Apr. 30, 2015, Kimmo J. Mylly, "Apparatus and Method to Provide Cache Move With Non-Volatile Mass Memory System", 42 pages.
Final Office Action for U.S. Appl. No. 14/520,030, dated May 20, 2015, Olli Luukkaninen, "Apparatus and Method to Share Host System RAM with Mass Storage Memory RAM", 6 pages.
Office Action for U.S. Appl. No. 13/451,951 dated Jun. 18, 2015, Kimmo J. Mylly, "Managing Operational State Data of a Memory Module Using Host Memory in Association with State Change", 33 pages.
Office action for U.S. Appl. No. 13/527,745, dated Jun. 23, 2014, Floman et al., "Virtual Memory Module", 13 pages.
Office Action for U.S. Appl. No. 14/732,507, dated Jul. 1, 2015, Jani Hyvonen, "Extended Utilization Area for a Memory Device", 11 pages.
Office action for U.S. Appl. No. 14/945,757, dated Jul. 28, 2016, Luukkainen et al., "Apparatus and Method to Share Host System RAM with Mass Storage Memory RAM", 6 pages.
Final Office Action for U.S. Appl. No. 13/358,806, dated Sep. 10, 2014, Kimmo J. Mylly, "Apparatus and Method to Provide Cache Move With Non-Volatile Mass Memory System", 27 pages.
Office action for U.S. Appl. No. 14/732,507, dated Dec. 10, 2015, Hyvonen et al., "Extended Utilization Area for a Memory Device", 9 pages.
"PCI Local Bus Specification Revision 3.0", PCI-SGI, Feb. 3, 2004, 344 pages, pp. 238-246.
The PCT Search Report dated Feb. 25, 2015 for PCT application No. PCT/US2014/069616, 10 pgs.
The PCT Search Report and Written Opinion dated Mar. 6, 2014 for PCT application No. PCT/US13/56980, 11 pages.
The PCT Search Report and Written Opinion dated Apr. 16, 2014 for PCT application No. PCT/US13/49434, 8 pages.
The PCT Search Report and Written Opinion dated Sep. 5, 2013 for PCT application No. PCT/US13/37298, 9 pages.
Office action forOffice action for U.S. Appl. No. 14/566,547, dated Nov. 4, 2016, Mylly, "Unified Memory Type Aware Storage Module", 14 pages.
The Taiwanese Office Action dated Oct. 6, 2016 for Taiwanese Patent Application No. 102114073, a counterpart foreign application of U.S. Pat. No. 9,311,226, 6 pgs.
The Japanese Office Action dated Dec. 20, 2016 for Japanese Patent Application No. 2014-553773, a counterpart foreign application of U.S. Pat. No. 9,417,998.
Translation of the Chinese Office Action dated Jun. 20, 2017 for Chinese Patent Application No. 201380006769.8, a counterpart foreign application of U.S. Pat. No. 9,417,998, 8 pgs.
The European Office Action dated Jul. 5, 2017 for European patent application No. 09715221.9, a counterpart foreitgn application of U.S. Pat. No. 8,307,180, 6 pages.
The Chinese Office Action dated Apr. 21, 2017 for Chinese Patent Application No. 201510093389.3, a counterpart foreign application of U.S. Pat. No. 8,307,180.
Translated Japanese Office Action dated Apr. 21, 2017 for Japanese patent application No. 2015-099731, a counterpart foreign application of U.S. Pat. No. 8,307,180, 6 pages.
Office action for U.S. Appl. No. 15/181,293, dated Oct. 5, 2017, Hyvonen et al., "Extended Utilization Area for a Memory Device", 7 pages.
Office Action for U.S. Patent Application, dated Aug. 23, 2017, Mylly, "Managing Operational State Data in Memory Module", 10 pages.
The Taiwanese Office Action dated Aug. 11, 2017 for Taiwanese patent application No. 106101747, a counterpart foreign application of U.S. Pat. No. 9,311,226.
Chinese Office Action dated Dec. 15, 2017 for Chinese Patent Application No. 201510093389.3, a counterpart foreign application of U.S. Pat. No. 8,307,180, 6 pgs.
Taiwanese Office Action dated Jan. 18, 2018 for Taiwanese Patent Application No. 106101747, a counterpart foreign application of U.S. Pat. No. 9,311,226, 4 pgs.

* cited by examiner

APPARATUS AND METHOD TO SHARE HOST SYSTEM RAM WITH MASS STORAGE MEMORY RAM

RELATED APPLICATION

This patent application is a continuation of and claims priority to U.S. patent application Ser. No. 14/945,757, filed Nov. 19, 2015, which claims priority to U.S. patent application Ser. No. 14/520,030, filed Oct. 21, 2014, now U.S. Pat. No. 9,208,078 and issued Dec. 8, 2015, which claims priority to U.S. patent application Ser. No. 12/455,763, entitled "Apparatus and Method to Share Host System RAM with Mass Storage Memory RAM," filed Jun. 4, 2009, now U.S. Pat. No. 8,874,824 and issued Oct. 28, 2014. The entire contents of U.S. utility patent application Ser. Nos. 14/945,757, 14/520,030, and 12/455,763, and U.S. Pat. Nos. 9,208,078 and 8,874,824 are fully incorporated herein by reference.

TECHNICAL FIELD

The exemplary and non-limiting embodiments of this invention relate generally to memory storage systems, methods, devices and computer programs and, more specifically, relate to mass memory devices, such as those containing non-volatile flash memory.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:
CPU central processing unit
eMMC embedded multimedia card
exFAT extended file allocation table
LBA logical block address
MMC multimedia card
RAM random access memory
SCSI small computer system interface
SD secure digital
SW software
UFS universal flash storage Various types of flash-based mass storage memories currently exist. A basic premise of mass storage memory is to hide the flash technology complexity from the host system. A technology such as eMMC is one example.

FIG. 1A reproduces FIG. 2 from JEDEC Standard, Embedded MultiMediaCard (eMMC) Product Standard, High Capacity, JESD84-A42, June 2007, JEDEC Solid State Technology Association, and shows a functional block diagram of an eMMC. The JEDEC eMMC includes, in addition to the flash memory itself, an intelligent on-board controller that manages the MMC communication protocol. The controller also handles block-management functions such as logical block allocation and wear leveling. The interface includes a clock (CLK) input. Also included is a command (CMD), which is a bidirectional command channel used for device initialization and command transfers. Commands are sent from a bus master to the device, and responses are sent from the device to the host. Also included is a bidirectional data bus (DAT[7:0]). The DAT signals operate in push-pull mode. By default, after power-up or RESET, only DAT0 is used for data transfer. The memory controller can configure a wider data bus for data transfer using either DAT[3:0] (4-bit mode) or DAT[7:0] (8-bit mode).

One non-limiting example of a flash memory controller construction is described in "A NAND Flash Memory Controller for SD/MMC Flash Memory Card", Chuan-Sheng Lin and Lan-Rong Dung, IEEE Transactions of Magnetics, Vol. 43, No. 2, February 2007, pp. 933-935 (hereafter referred to as Lin et al.) FIG. 1B reproduces FIG. 1 of Lin et al., and shows an overall block diagram of the NAND flash controller architecture for a SD/MMC card. The particular controller illustrated happens to use a w-bit parallel Bose-Chaudhuri-Hocquenghem (BCH) error-correction code (ECC) designed to correct random bit errors of the flash memory, in conjunction with a code-banking mechanism. Of particular interest herein are the various RAM memories (e.g., buffer RAM, bank RAM, common RAM) that form part of the controller architecture.

Reference may also be made to US Patent Application Publication 2008/0228984, Sep. 18, 2008, "Single-Chip Multi-Media Card/Secure Digital (MCC/SD) Controller Reading Power-On Boot Code from Integrated Flash Memory for User Storage", I-Kang Yu et al. This publication describes another example of a flash controller where a Multi-Media Card/Secure Digital (MMC/SD) single-chip flash device contains a MMC/SD flash microcontroller and flash mass storage blocks containing flash memory arrays that are block-addressable rather than randomly-addressable. MMC/SD transactions from a host MMC/SD bus are read by a bus transceiver on the MMC/SD flash microcontroller. Various routines that execute on a CPU in the MMC/SD flash microcontroller are activated in response to commands in the MMC/SD transactions. A flash-memory controller in the MMC/SD flash microcontroller transfers data from the bus transceiver to the flash mass storage blocks for storage. Rather than booting from an internal ROM coupled to the CPU, a boot loader is transferred by direct memory access (DMA) from the first page of the flash mass storage block to an internal RAM. The flash memory is automatically read from the first page at power-on. The CPU then executes the boot loader from the internal RAM to load the control program. This approach is said to enable the microcontroller ROM to be eliminated or minimized.

Also of potential interest is an application note AN2539 "How to boot an embedded system from an eMMC™ equipped with a Microsoft FAT file system", Numonyx B.V., November 2008. This application note in Appendix A provides an overview of eMMC, and in Appendix B provides an overview of FAT.

SUMMARY

In a first aspect thereof the exemplary embodiments of this invention provide a method that comprises, in response to an allocation of read/write memory in a host device for use by a mass memory storage device, writing data from the mass memory storage device to the allocated read/write memory of the host device; and subsequently reading the data from the allocated memory to the mass memory storage device.

In another aspect thereof the exemplary embodiments of this invention provide an apparatus that comprises a controller; a volatile memory that is readable and writable by the controller; a non-volatile memory that is readable and writable by the controller; and an interface for connecting the apparatus to a host device. The controller is configurable to respond to an allocation of read/write memory in the host device to write data to the allocated memory of the host device, and to subsequently read the data from the allocated memory.

In another aspect thereof the exemplary embodiments of this invention provide a method that comprises allocating read/write memory in a host device for use by a mass memory storage device; receiving data from the mass memory storage device and writing the received data into the allocated read/write memory of the host device; and subsequently sending the data from the allocated memory to the mass memory storage device.

In a still further aspect thereof the exemplary embodiments of this invention provide an apparatus that comprises a controller; a memory that is readable and writable by the controller; and an interface for connecting the apparatus to a mass storage memory device. The controller is configurable to allocate a portion of the memory for use by the mass storage memory device. The controller is further configurable to receive data from the mass storage memory device and to store the received data in the allocated portion of the memory, and to subsequently send the data from the allocated portion of the memory to the mass storage memory device.

DETAILED DESCRIPTION

At present, most mass storage memories provide LBA-based access, e.g., eMMC and different types of external memory cards such as SD. However, it may also be the case that the entire file system (FS) SW is embedded in the mass storage memory device.

When a mass storage memory is used in a high volume consumer device, such as a mobile wireless communication device, one important consideration is cost, and one factor affecting the cost is the amount of RAM in the mass storage memory device itself Another important consideration is performance. The overall performance depends on many factors. For example, for lengthy (time consuming) operations (in particular if the mass storage memory device contains an entire file system SW) there would be an advantage to include a substantial amount of RAM in the mass storage memory device. However, this can have a negative impact on the cost.

It may be the case that system context (metadata) would be stored in the flash memory of the mass storage memory device. However, this approach has several associated disadvantages. For example, repeatedly writing the system context (metadata) to the mass storage memory device raises wearing issues that can impact the usable life of the mass storage memory device. Also, writing data to the flash memory can be a relatively slow process.

Another important consideration is power efficiency. To provide good power efficiency the mass storage memories are preferably shutdown (powered-off) when not needed (meaning also that the internal RAM of the device is preferably shutdown as well). However, and assuming that the RAM is volatile in nature, then whatever data is stored in the RAM is lost when the power is removed from the RAM. To then perform re-initialization after power-up all needed information (e.g., logical-to-physical mapping information and/or file system structures) need to be restored. A full re-initialization of a LBA mass storage memory may require a substantial (and user-noticeable) amount of time (e.g., up to one second with an SD card), and entire file system initialization (if the file system is resident in the mass storage memory) may take even longer. Therefore, it is desirable to retain internal device context over the power-off/power-on cycle.

Figure 1A:
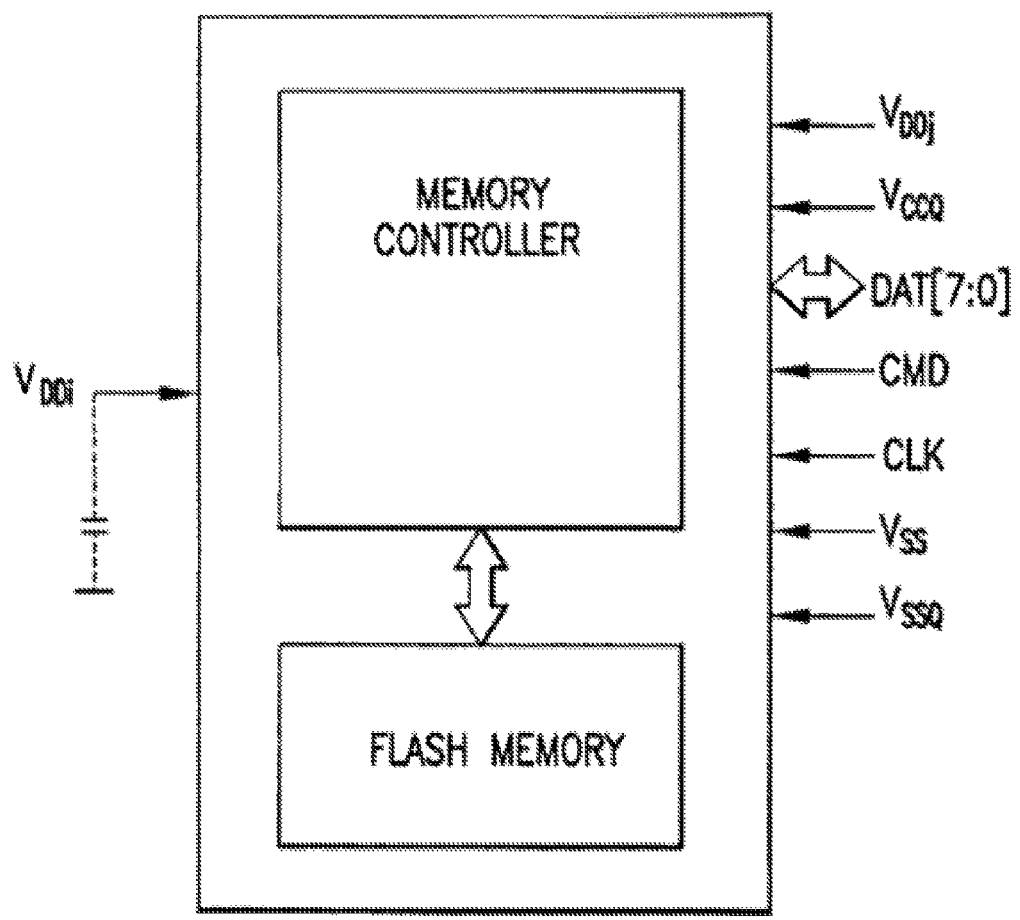
FIG. 1A reproduces FIG. 2 from JEDEC Standard, Embedded MultiMediaCard (eMMC) Product Standard, High Capacity, JESD84-A42, June 2007, JEDEC Solid State Technology Association, and shows a functional block diagram of an eMMC.
Figure 1B:
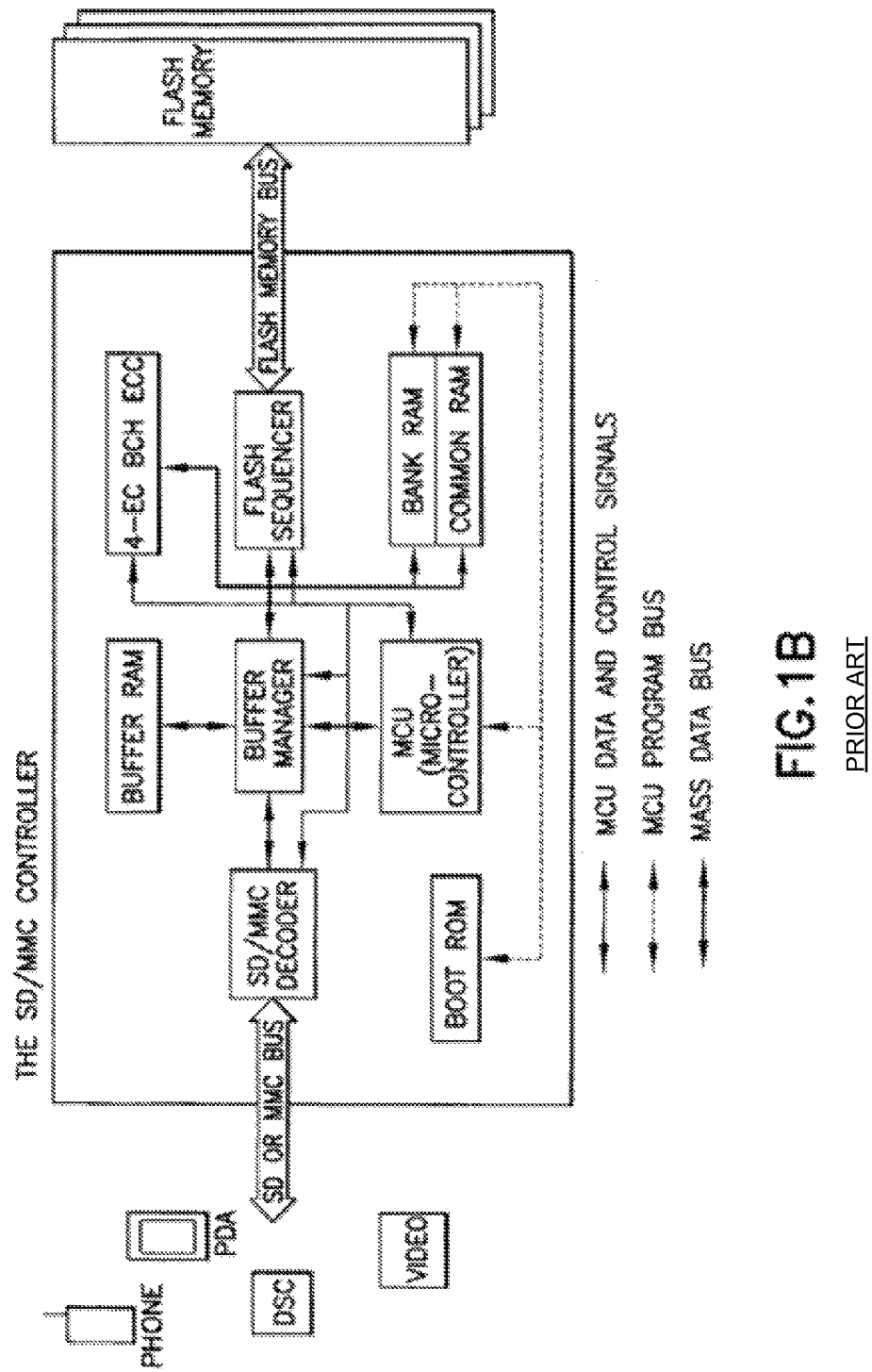
FIG. 1B reproduces FIG. 1 of Lin et al., and shows an example of an overall block diagram of a NAND flash controller architecture for a SD/MMC card.
Figure 2:
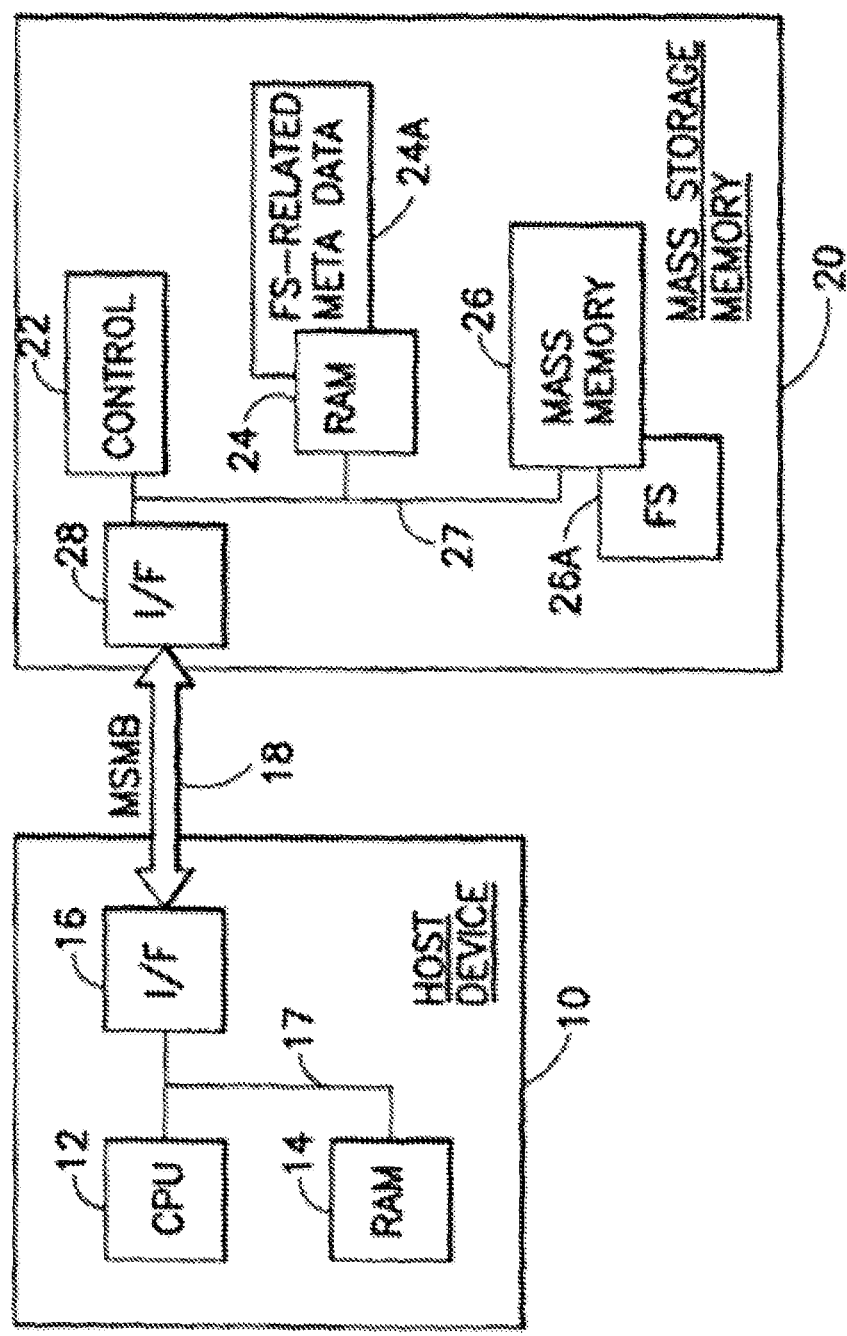
FIG. 2 is a simplified block diagram of a host device connected with a mass storage memory device, and is helpful in describing the exemplary embodiments of this invention.

Before further describing the exemplary embodiments of this invention, reference is made to FIG. 2 which shows is a simplified block diagram of a host system or device 10 connected with a mass storage memory 20 via a mass storage memory bus (MSMB) 18. The MSMB 18 may be compatible with any suitable mass memory interface standard such as MMC or UFS, as two non-limiting examples. The MSMB 18 may include signal lines such as those shown in FIG. 1A for an eMMC embodiment. The host device 10 includes at least one controller, such as a CPU 12 that operates in accordance with stored program instructions. The program instructions may be stored in a RAM 14 or in another memory or memories. The CPU 12 is connected with the RAM 14 and a MSMB interface (I/F) 16 via at least one internal bus 17. The MSMB interface 16 may include a memory controller (MC), or may be coupled with a MC unit associated with the CPU 12. The host device 10 may be a computer, a cellular phone, a digital camera, a gaming device or a PDA, as several non-limiting examples. Note that the RAM 14 may be any read/write memory or memory device, such as semiconductor memory or a disk-based memory.

The mass storage memory 20 includes a microcontroller or, more simply, a controller 22 that is connected via at least one internal bus 27 with a volatile RAM 24, a non-volatile mass memory 26 (e.g., a multi-gigabyte flash memory mass storage) and a MSMB interface (I/F) 28. The controller 22 operates in accordance with stored program instructions. The program instructions may be stored in the RAM 24 or in a ROM or in the mass memory 26. The mass storage memory 20 may be embodied as an MMC, eMMC or a SD device, as non-limiting examples, and may be external to (plugged into) the host device 10 or installed within the host device 10. Note that the mass memory 26 may, in some embodiments, store a file system (FS) 26A. In this case then the RAM 24 may store FS-related metadata 24A, such as one or more data structures comprised of bit maps, file allocation table data and/or other FS-associated information.

The exemplary embodiments of this invention provide a technique to share the RAM 14 of the host device 10 with the mass storage memory device 20. It may be assumed that the host device 10 (e.g., a mobile computer, a cellular phone, a digital camera, a gaming device, a PDA, etc.) has the capability to allocate and de-allocate the RAM 14. As will be discussed in further detail below, the allocation of the RAM 14 may be performed dynamically or it may be performed statically. The allocation of a portion of the RAM may be performed in response to a request received at the host device 10, or at the initiative of the host device 10.

In the exemplary embodiments of this invention the RAM 14 allocation is provided for the mass storage memory 20 (connected via the MSMB 18 to the host CPU 12), if the mass storage memory 20 has a need to extend its own RAM 24 space and/or if the mass storage memory 20 has a need for non-volatile RAM (the contents of which are not lost when the mass storage memory 20 is powered-off). It is also within the scope of the exemplary embodiments of this invention for the mass storage memory 20 to read and/or write (R/W) allocated RAM 14 in the host device 10. The allocation/de-allocation and R/W access methods may be implemented by extensions to a command set used to communicate with the mass storage memory 20 via an applicable mass storage memory protocol.

Figure 3:
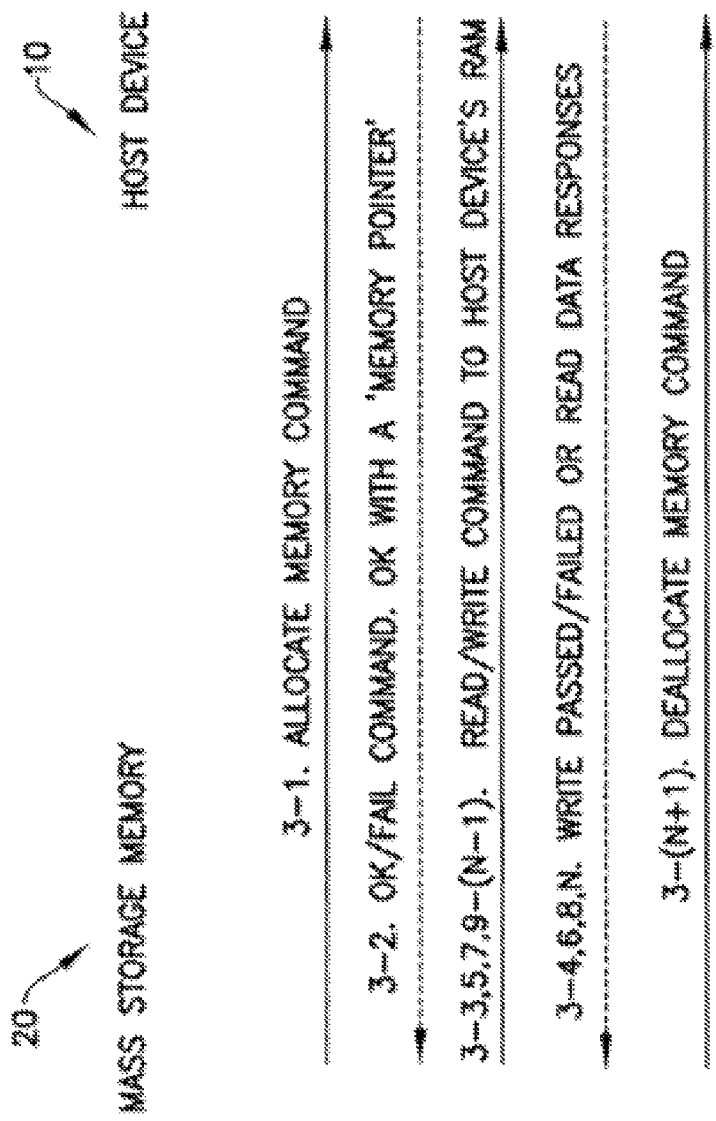
FIG. 3 is a signal/message flow diagram that describes an exemplary embodiment of this invention for the mass storage memory device of FIG. 2 to allocate, use and de-allocate RAM of the host device.

In accordance with certain exemplary embodiments of this invention the mass storage memory device 20 is provided with a mechanism to interrupt/send a message to host device 10 to initiate an allocation of space in the RAM 14. The interrupt/message is sent over the MSMB 18, and may be considered as an extension to current command sets. Referring to FIG. 3, an allocate memory command is sent during operation 3-1. If the allocation request succeeds (indicated during operation 3-2) the controller 22 is enabled to extend its own RAM 24 with the RAM 14 of the host device 10. The mass storage memory device 20 may store, for example, large tables into the RAM 14 using a RAM WRITE command (a newly specified command), or it may fetch data from the host device RAM 14 using a RAM READ command (another newly specified command). The read or write operation is shown as interleaved operations 3-3, 3-4, 3-5, 3-6, . . . , 3-(N−1), 3-N. When the mass storage memory device 20 completes the operation with the RAM 14 it may free the host device RAM 14 using another newly specified command that requests that the host 10 RAM memory be de-allocated (operation 3-(N+1)).

Figure 4:
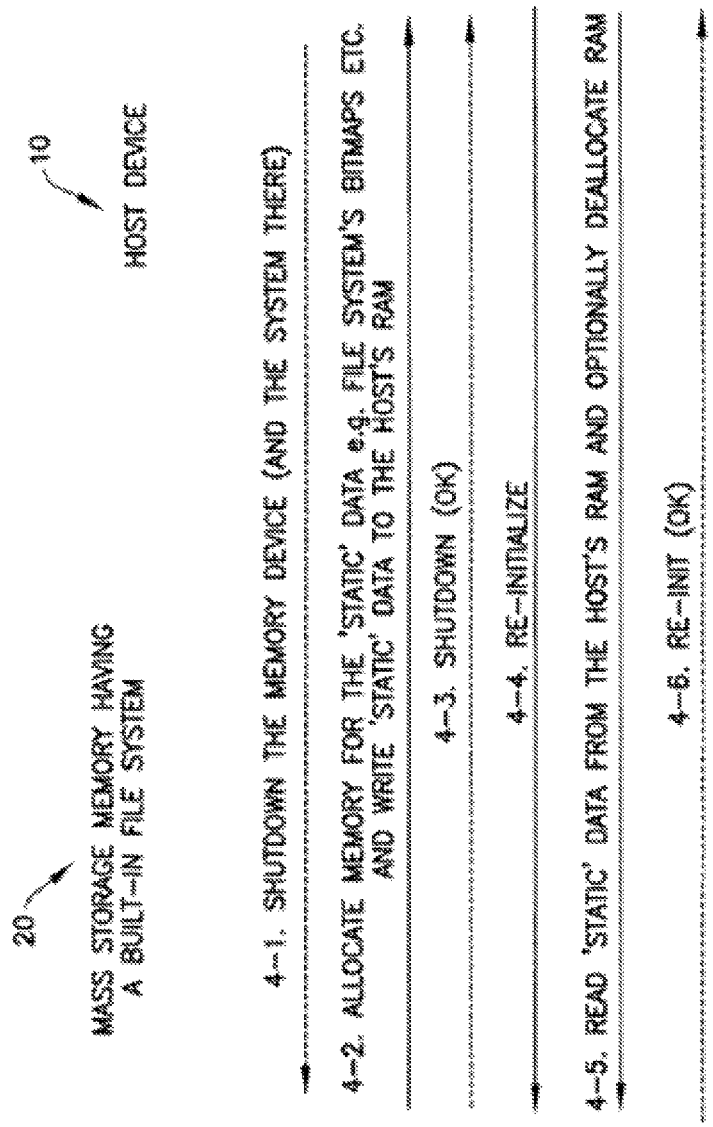
FIG. 4 is a signal/message flow diagram that describes another exemplary embodiment of this invention, where the mass storage memory device of FIG. 2 has a built-in file system.

FIG. 4 illustrates a further exemplary embodiment that utilizes the host system RAM 14 for the mass storage memory 26 having a built-in file system, such as the FS 26A shown in FIG. 2. First the host system 10 sends a SHUTDOWN command to the mass storage memory device 20 (operation 4-1). Next the mass storage memory device 20 allocates RAM 14 from the host 10 and then loads (stores using a RAM WRITE command) all vital 'static' file system-related data (meta-data 24A) into host RAM 14 (operation 4-2). 'Static' data in this context may be, for example, various bitmaps, such as an allocation bitmap in the exFAT or ext3 file systems. This data may be processed (e.g., at least one of sorted, arranged and filtered) by the CPU 12 (controller) of the host device, and may include data from a large number of sectors in the mass storage memory 26. Mass memory storage device 20 may then send a shutdown OK indication (operation 4-3). The host 10 can remove power from the mass memory storage device 20, and the device 20 may be physically removed from the MSMB 18. Re-initialization (operations 4-4, 4-5, 4-6) of the mass storage memory device 20 is performed when host device 10 needs to get/put certain data from or into the mass storage memory device 20. Re-initialization of the mass storage memory 26 (and the file system 26A) may be sped up by using the sorted/arranged/filtered read data from the RAM 14. When the re-initialization operation is completed the mass storage memory device 20 may de-allocate the used RAM 14 in the host device 10, or the RAM 14 may not be de-allocated thereby reserving the RAM space for future use by the mass storage memory device 20.

It should be noted that in other exemplary embodiments of this invention the allocation of host RAM 14 may occur differently. For example, the host device 10 may allocate RAM 14 dynamically and pass a 'pointer' to the allocated RAM to the mass storage memory device 20. It is then up to the controller 22 of the mass storage memory device 20 how to utilize the allocated host RAM 14. Note that in this embodiment an explicit allocation request from the mass storage memory device 20 may not be sent to the host device 10. Instead, the host device 10 may on its own initiative allocate a portion of the RAM 14, such as when it first detects the presence of the mass memory storage device 20. Of course, subsequent signaling between the mass storage memory device 20 and the host device 10 may be used to change the size of the allocated RAM 14 if the initial allocation is not sufficient for the needs of the controller 22. As another example of RAM 14 allocation, a portion of the RAM 14 may be allocated by the host 10 in a static manner, and the mass storage memory device 20 then simply uses the same portion of the RAM 14 each time it needs to extend the RAM 24. In this case the mass storage memory device 20 may already have knowledge of the location/size of the allocated RAM 14, and a pointer is not needed to be sent from the host device 10.

Note that while it may typically be the case that the mass storage memory device 20 will receive an allocation of host memory to store contents of the volatile RAM 24, in general the allocation may be for storing data for any read/write memory contained within the mass storage memory device 20.

Figure 5:
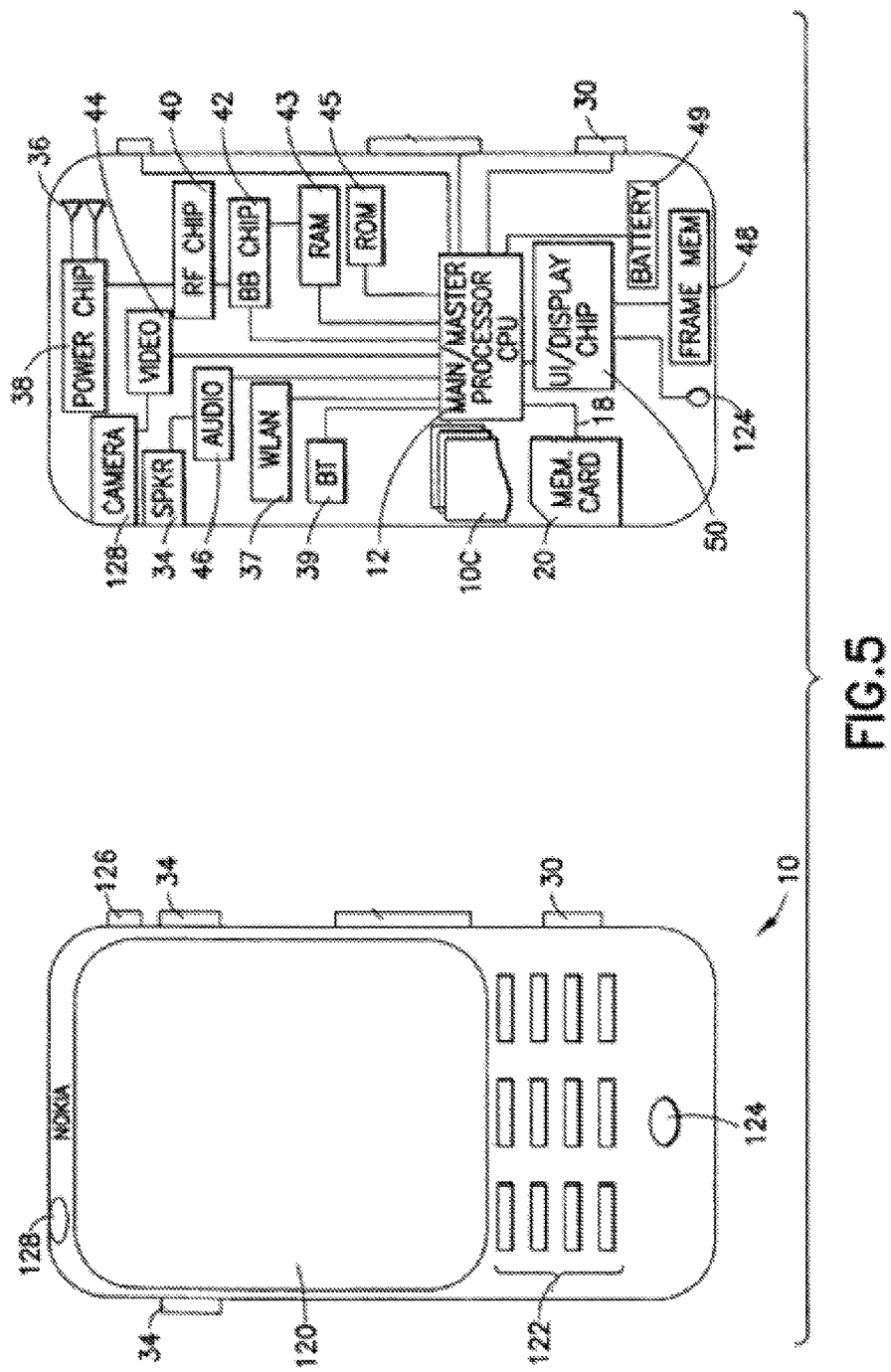
FIG. 5 shows a block diagram of one exemplary embodiment of the host device when embodied as a wireless communication device.

FIG. 5 illustrates one non-limiting embodiment of the host device 10 used with the mass storage memory device 20, referred to in FIG. 5 simply as a memory card. In this exemplary embodiment the host device is embodied as a user equipment (UE), shown in both plan view (left) and sectional view (right). In FIG. 5 the UE 10 has a graphical display interface 120 and a user interface 122 illustrated as a keypad but understood as also encompassing touch screen technology at the graphical display interface 120 and voice recognition technology received at the microphone 124. A power actuator 126 controls the device being turned on and off by the user. The exemplary UE 10 may have a camera 128 which is shown as being forward facing (e.g., for video calls) but may alternatively or additionally be rearward facing (e.g., for capturing images and video for local storage). The camera 128 is controlled by a shutter actuator 30 and optionally by a zoom actuator which may alternatively function as a volume adjustment for the speaker(s) 34 when the camera 128 is not in an active mode.

Within the sectional view of FIG. 5 are seen multiple transmit/receive antennas 36 that are typically used for cellular communication. The antennas 36 may be multi-band for use with other radios in the UE. The operable ground plane for the antennas 36 is shown by shading as spanning the entire space enclosed by the UE housing though in some embodiments the ground plane may be limited to a smaller area, such as disposed on a printed wiring board on which the power chip 38 is formed. The power chip 38 controls power amplification on the channels being transmitted and/ or across the antennas that transmit simultaneously where spatial diversity is used, and amplifies the received signals. The power chip 38 outputs the amplified received signal to a radio frequency (RF) chip 40 which demodulates and downconverts the signal for baseband processing. A baseband (BB) chip 42 detects the signal which is then converted to a bit stream and finally decoded. Similar processing occurs in reverse for signals generated in the host device 10 and transmitted from it.

Signals going to and from the camera 128 may pass through an image/video processor 44 that encodes and decodes the various image frames. A separate audio processor 46 may also be present controlling signals to and from the speakers 34 and the microphone 124. The graphical display interface 120 is refreshed from a frame memory 48 as controlled by a user interface chip 50 which may process signals to and from the display interface 20 and/or additionally process user inputs from the keypad 22 and elsewhere.

Certain embodiments of the UE 10 may also include one or more secondary radios such as a wireless local area network radio WLAN 37 and a Bluetooth7 radio 39, which may incorporate an antenna on the chip or be coupled to an antenna off the chip. Throughout the apparatus are various memories such as random access memory RAM 43, read only memory ROM 45, and in some embodiments removable memory such as the illustrated memory card 20 on which various programs 10C may be stored. All of these components within the UE 10 are normally powered by a portable power supply such as a battery 49.

The processors 38, 40, 42, 44, 46, 50, if embodied as separate entities in a UE 10, may operate in a slave relationship to the main processor (CPU) 12, which may then be in a master relationship to them. Certain embodiments may be disposed across various chips and memories as shown, or disposed within another processor that combines some of the functions described above for FIG. 5. Any or all of these various processors of FIG. 5 access one or more of the various memories, which may be on chip with the processor or separate from the chip with the processor. Note that the various integrated circuits (e.g., chips 38, 40, 42, etc.) that were described above may be combined into a fewer number than described and, in a most compact case, may all be embodied physically within a single chip.

In this exemplary embodiment the CPU 12 of the UE 10 (the host device) operates with the memory card 20 (the mass storage memory device) as described above with respect to FIGS. 3 and 4 so that the RAM 24 of the memory card 20 may be extended to use the RAM 14 of the UE 10.

There are a number of technical effects that may be realized by the use of the exemplary embodiments of the invention. For example, there is provided a cost efficient way to extend RAM in the mass storage memory device 20. Further by example, the mass storage memory device 20 may be powered off, while retaining mass storage memory device information on the RAM 14 of the host system.

Based on the foregoing it should be apparent that the exemplary embodiments of this invention provide a method, apparatus and computer program(s) to extend the RAM of a mass storage memory device to include the RAM of an attached host device.

Figure 6:
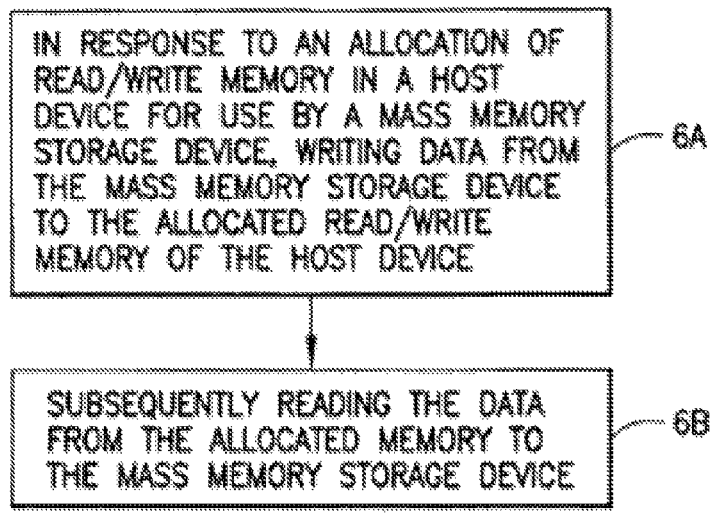
FIG. 6 is a logic flow diagram that illustrates the operation of a method, and a result of execution of computer program instructions embodied on a computer readable memory, in accordance with the exemplary embodiments of this invention.

FIG. 6 is a logic flow diagram that illustrates the operation of a method, and a result of execution of computer program instructions, in accordance with the exemplary embodiments of this invention. In accordance with these exemplary embodiments a method performs, at Block 6A, in response to an allocation of read/write memory in a host device for use by a mass memory storage device, writing data from the mass memory storage device to the allocated read/write memory of the host device. At Block 6B there is an operation of subsequently reading the data from the allocated memory to the mass memory storage device.

Figure 7:
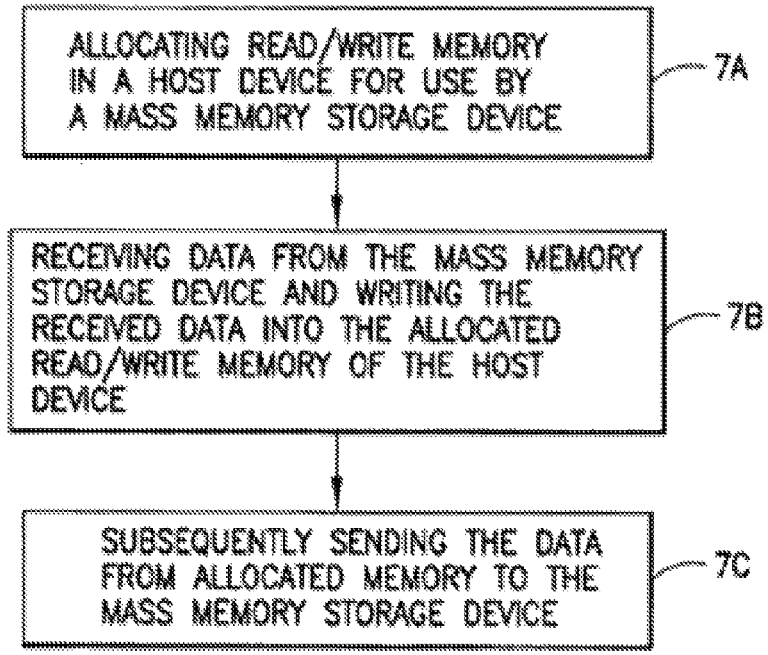
FIG. 7 is a logic flow diagram that illustrates the operation of a method, and a result of execution of computer program instructions embodied on a computer readable memory, further in accordance with the exemplary embodiments of this invention.

FIG. 7 is a logic flow diagram that illustrates the operation of a method, and a result of execution of computer program instructions, in accordance with the exemplary embodiments of this invention. In accordance with these exemplary embodiments a method performs, at Block 7A, an operation of allocating read/write memory in a host device for use by a mass memory storage device. At Block 7B there is an operation of receiving data from the mass memory storage device and writing the received data into the allocated read/write memory of the host device. At Block 7C there is an operation of subsequently sending the data from the allocated memory to the mass memory storage device.

The various blocks shown in FIGS. 6 and 7 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A memory device, comprising:
   a controller;
   a random access memory that is readable and writable by the controller; and
   an interface for connecting the memory device to a host device;
   the controller operable to:
      based at least in part on receiving, from the host device, a pointer associated with a portion of host random access memory in the host device that is allocated for use by the memory device, create an extended random access memory that includes at least the portion of the host random access memory that is allocated for use by the memory device;
      write data to the extended random access memory; and
      read the data from the extended random access memory.

2. The memory device of claim 1, wherein the pointer points to allocation information that describes the portion of the host random access memory allocated for use by the memory device.

3. The memory device of claim 2, wherein the allocation information comprises at least one of a location or a size of the portion of the host random access memory.

4. The memory device of claim 1, wherein the pointer enables access to the portion of the host random access memory.

5. The memory device of claim 1, wherein the pointer comprises at least one address at which allocation information that describes the portion of the host random access memory allocated for use by the memory device is located.

6. The memory device of claim 5, wherein the allocation information comprises at least one of a location or a size of the portion of the host random access memory.

7. The memory device of claim 1, wherein the controller is further operable to request that the host device allocate the portion of the host random access memory.

8. The memory device of claim 7, wherein the controller is further operable to request a size of the portion of the host random access memory to be allocated by the host device.

9. The memory device of claim 1, wherein the controller is further operable to transmit a command to the host device to deallocate the portion of the host random access memory for use by the memory device.

10. A method comprising:
    receiving, at a memory device coupled to a host device, a pointer associated with a portion of host random access memory in the host device that is allocated for use by the memory device;
    creating, by the memory device, an extended random access memory that includes the portion of the host random access memory;
    writing, by the memory device, data to the extended random access memory; and
    reading, by the memory device, the data from the extended random access memory.

11. The method of claim 10, wherein the pointer points to allocation information that describes the portion of the host random access memory, the allocation information comprising at least one of a location or a size of of the portion of the host random access memory.

12. The method of claim 10, wherein the pointer comprises at least one address at which allocation information that describes the portion of the host random access memory is located, the allocation information comprising at least one of a location or a size of the portion of the host random access memory.

13. The method of claim 10, further comprising requesting, by the memory device, that the host device allocate the portion of the host random access memory.

14. The method of claim 10, further comprising transmitting, by the memory device, a command to the host device to deallocate the portion of the host random access memory for use by the memory device.

15. A host device comprising:
    an interface to connect the host device to a memory device;
    a host random access memory; and
    a processing entity that is operable to:
       send, to the memory device, a pointer associated with a portion of the host random access memory that is allocated for inclusion in an extended random access memory useable by the memory device;
       receive at least a first command to write data to the extended random access memory; and
       receive at least a second command to read the data from the extended random access memory.

16. The host device of claim 15, wherein the pointer points to allocation information that describes the portion of the host random access memory.

17. The host device of claim 16, wherein the allocation information comprises at least one of a location or a size of the portion of the host random access memory.

18. The host device of claim 15, wherein the pointer comprises at least one address at which allocation information that describes the portion of the host random access memory is located.

19. The host device of claim 18, wherein the allocation information comprises at least one of a location or a size of the portion of the host random access memory.

20. The host device of claim 15, wherein the processing entity is further operable to:
    receive a deallocation command from the memory device; and
    deallocate the portion of the host random access memory from use by the memory device.

* * * * *